Aug. 16, 1932.  D. W. SMITH  1,871,754
PIE SEPARATOR AND TRIMMER FOR PIE MAKING MACHINERY
Filed June 19, 1931
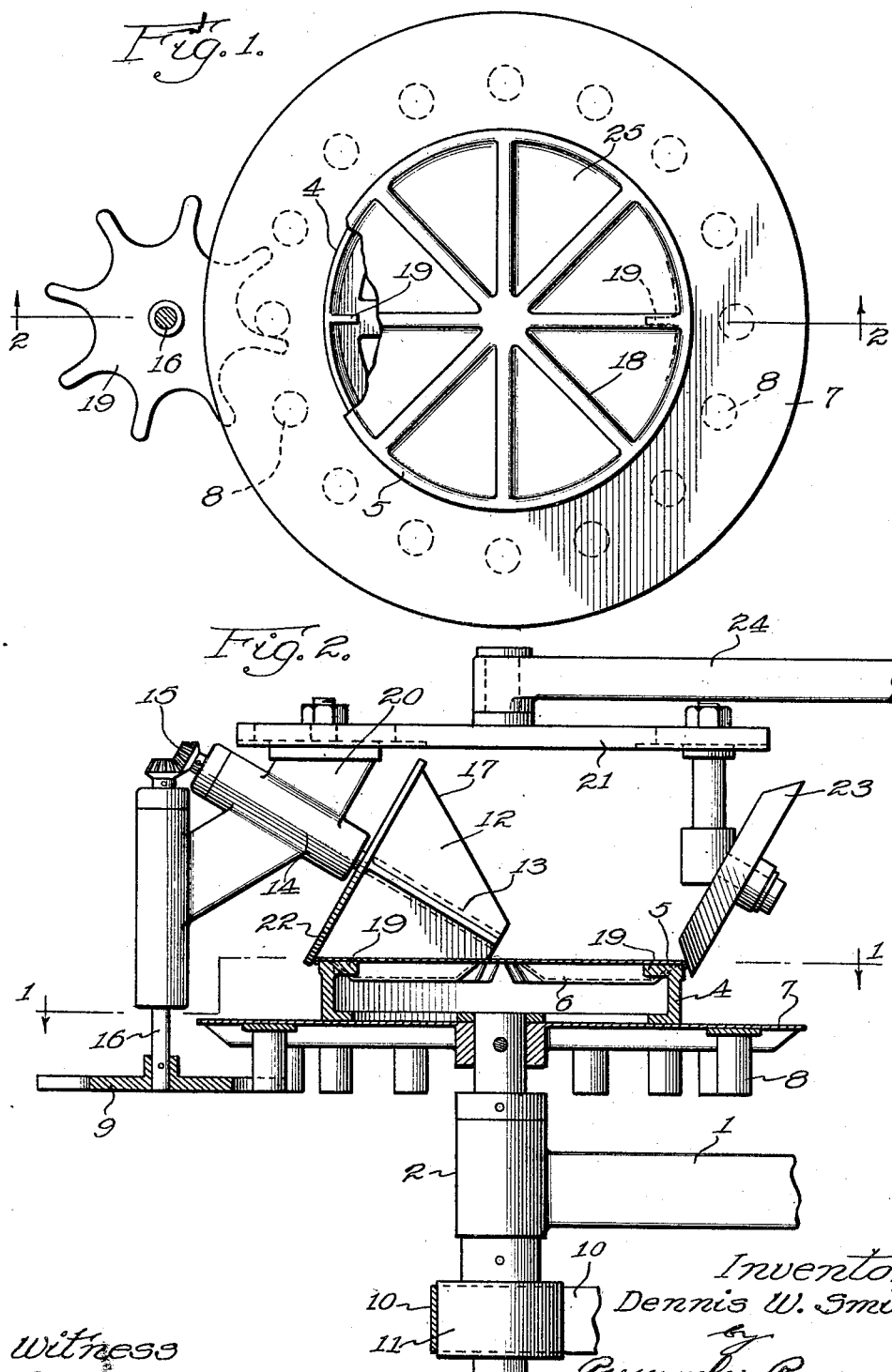
Inventor
Dennis W. Smith.
Witness
Arthur M. Franke.

Patented Aug. 16, 1932

1,871,754

UNITED STATES PATENT OFFICE

DENNIS W. SMITH, OF WILMETTE, ILLINOIS, ASSIGNOR TO COLBORNE MANUFACTURING CO., OF CHICAGO, ILLINOIS, A CORPORATION OF ILLINOIS

PIE SEPARATOR AND TRIMMER FOR PIE MAKING MACHINERY

Application filed June 19, 1931. Serial No. 545,454.

This invention relates to pie making machinery and is applicable for use in connection with pie machines of the conveyor type disclosed in applicant's Patents No. 1,725,835, of August 27, 1929; or No. 1,595,428, of August 10, 1926; or No. 1,595,427, of August 10, 1926; or to the rotary type of pie machine described in patent to Oliver Colborne, No. 927,490, of July 13, 1909.

The objects of the invention are to provide improvements in pie making machines which render such machines suitable for separating and trimming pies formed in pie plates, which are shaped for the production of sector shaped complete, individual pies corresponding to the usual sector shaped cuts into which a round shaped pie is generally divided.

The objects of the invention are accomplished by means of a construction as illustrated in the drawing, wherein:

Figure 1 is a plan view of a pie plate holder with a pie plate therein suitably formed to make sector shaped pies. Trimming and dividing or separating mechanism located above the holder is omitted from this view as indicated by the section line 1—1 of Figure 2.

Fig. 2 is an elevational view of the separator and trimming mechanism and shows a pie plate holder and pie plate therein, in section as indicated by the line 2—2 of Fig. 1.

The invention is carried into practice by means of a rotary pie plate holder formed to support for rotation therewith pie plates having radial divisions to form individual sector shaped pies. Geared to the holder, to rotate therewith, is a separator and trimming element which is conical in outline and includes flanges for engaging the radial partitions of pie plates for the purpose of separating the crust elements of pies at the upper edges of the radial partitions, in order that the completed product carried by each pie plate may be individual sector shaped pies.

Referring to the drawing, part of the frame structure 1 of the machine is shown to include a bearing 2 for a vertical shaft 3, at the upper end of which is mounted pie plate supporting means which includes the annular flange 4 upon which may rest the rim 5 of a pie plate 6. Extending horizontally from the flange 4 is a disk 7 for receiving trimmings cut from the edge of crust forming dough placed upon the pie plate. This disk also carries depending tubes 8 for meshing with a rotating toothed wheel 9, which drives the separator element 10.

Shaft 3 is rotated, for example, by belt 10 on pulley 11, or any other suitable driving means. The conical shaped separating element 12 is carried by a shaft 13 supported in bearing 14, and through the gearing 15 and shaft 16 is driven by toothed wheel 9. The separator includes triangular shaped flanges 17 extending from shaft 13 and spaced apart to conform to the partitions 18 of pie plate 6. These partitions are hollow to receive lugs 19 extending inwardly from flange 4 of the pie plate holder.

The bearings for the shafts 13 and 16 are integral with the bracket 20, which is supported on an arm 21 for radial adjustment thereon to bring an angular flange 22 of the separator 12 into pie crust shearing coaction with the outer edge of the pie plate rim 5. An opposed trimming roller 23 is also radially adjustable on arm 21 for the same purpose. Arm 21 is supported by part 24.

In the use of this separating and trimming mechanism the disk shaped piece of dough which forms the lower crust of the pie is caused to conform to the depressions 25 and extend over the partition walls 18 and rim 5 of the pie plate. The pie filling is then flowed into the depressions 25 and the upper crust forming piece of dough placed thereover, before the pie plate holder arrives in position for coaction with the separating and trimming rollers 12 and 23. Then a rolling action is produced between the pie plate holder and the separating and trimming elements, for example, by the drive and gear connections illustrated.

The flange 22 of the separator 12 trims the excess dough from the rim of the pie plate on one side, while the opposed frictionally driven roller 23 is trimming the dough on the opposite side of the pie plate. The flanges 17 of the separator being spaced apart according to the equi-distant partition walls 18 of the pipe plate, and the holder and separator being geared together, these flanges press downwardly upon the upper surfaces of the partition walls 18, dividing the crust dough layers on these partition walls.

After the baking operation, the completed pies are removed from the pie plate as sector shaped individual pies, the upper and lower crusts adhering to each other, as they are pressed together at the separating operation of the separator 12. The outer edges of flanges 17 are preferably rounded for this purpose.

Although but one specific embodiment of this invention has been herein shown and described, it will be understood that certain details of the construction shown may be altered or omitted without departing from the spirit of this invention as defined by the following claims.

I claim:

1. In a pie machine, a pie plate holder supported upon a vertical axis, a pie separator element supported for rotation on an axis inclined to the axis of said holder for cooperation with pie plates supported by said holder, said separator element having longitudinal flanges extending a greater radial distance from said separator at one end than at the other, whereby said separator element when rolled over the pie plate on said holder, will divide a pie on the pie plate into equal sectors, and means for producing a rolling motion between the plate holder and the separator.

2. In a pie machine, a pie plate holder, a separator element mounted for rotation upon an axis inclined to the plane of said holder, and having equi-distant longitudinal flanges, said flanges being of greater depth near the periphery of the holder than near the center of the holder, the separator element being provided with an annular trimming flange at the wide end of said longitudinal flanges, and means for producing a rolling action between the plate holder and the separator element.

3. A pie machine comprising a pie holder mounted for rotation on a vertical axis, pie trimming elements mounted upon opposite sides of said holder in position for engaging the edge of a pie plate supported by said holder, one of said trimming elements including a pie separating device arranged to divide the pies in the plates into equal sectors.

4. In a pie machine, a pie plate holder mounted upon a vertical axis, a pie plate supported in said holder, said pie plate being formed with a plurality of sector shaped depressions and radial partitions between said depressions, and means for engaging the upper edges of said partitions for the purpose of separating a pie in the pie plate into a plurality of sections, said means having a plurality of separating flanges, the outer edges of which conform to the surface of a cone.

5. In a pie machine, a pie plate holder having an upstanding annular flange for engaging the rim of a pie plate and provided with inwardly extending lugs in said annular flange for fitting between depressions in a pie plate, a pie separator having a gear connection with said holder, said separator being conical in outline and including longitudinal separating flanges, and means for rotating said plate holder and separator.

Signed at Chicago, in the county of Cook and State of Illinois, this 12th day of June, 1931.

DENNIS W. SMITH.